United States Patent [19]
Ballard

[11] 3,884,368
[45] May 20, 1975

[54] PANEL DESTACKER

[76] Inventor: Robert L. Ballard, 2205 Heather Street S.E., Grand Rapids, Mich. 49506

[22] Filed: Apr. 23, 1973

[21] Appl. No.: 353,245

[52] U.S. Cl.............. 214/8.5 D; 221/243; 221/244; 271/9 D
[51] Int. Cl............................................. B65g 59/04
[58] Field of Search......... 214/8.5 D, 8.5 C; 271/11, 271/90, 108; 221/211, 212, 243, 244

[56] References Cited
UNITED STATES PATENTS

| | | | |
|---|---|---|---|
| 2,361,176 | 10/1944 | Carvey | 214/8.5 D |
| 3,586,191 | 6/1971 | Brown | 214/8.5 D X |

FOREIGN PATENTS OR APPLICATIONS

| | | | |
|---|---|---|---|
| 1,147,525 | 6/1957 | France | 271/11 |
| 619,489 | 4/1961 | Italy | 214/8.5 D |
| 976,689 | 12/1964 | United Kingdom | 214/8.5 D |

Primary Examiner—Robert J. Spar
Assistant Examiner—George F. Abraham
Attorney, Agent, or Firm—Price, Heneveld, Huizenga & Cooper

[57] ABSTRACT

A panel destacking apparatus includes a base for supporting a stack of panels in alignment with a reciprocating panel gripping head movable between a panel gripping position for removing the outermost panel from the stack to a panel releasing position remote therefrom. The head is supported by suitable guide means and driven by a compressible linkage coupling the head to a drive mechanism such that as the thickness of the stack of panels varies with the successive removal of panels, the compressible interconnecting link between the head and drive means automatically compensates for the varying thickness of the stack.

9 Claims, 5 Drawing Figures

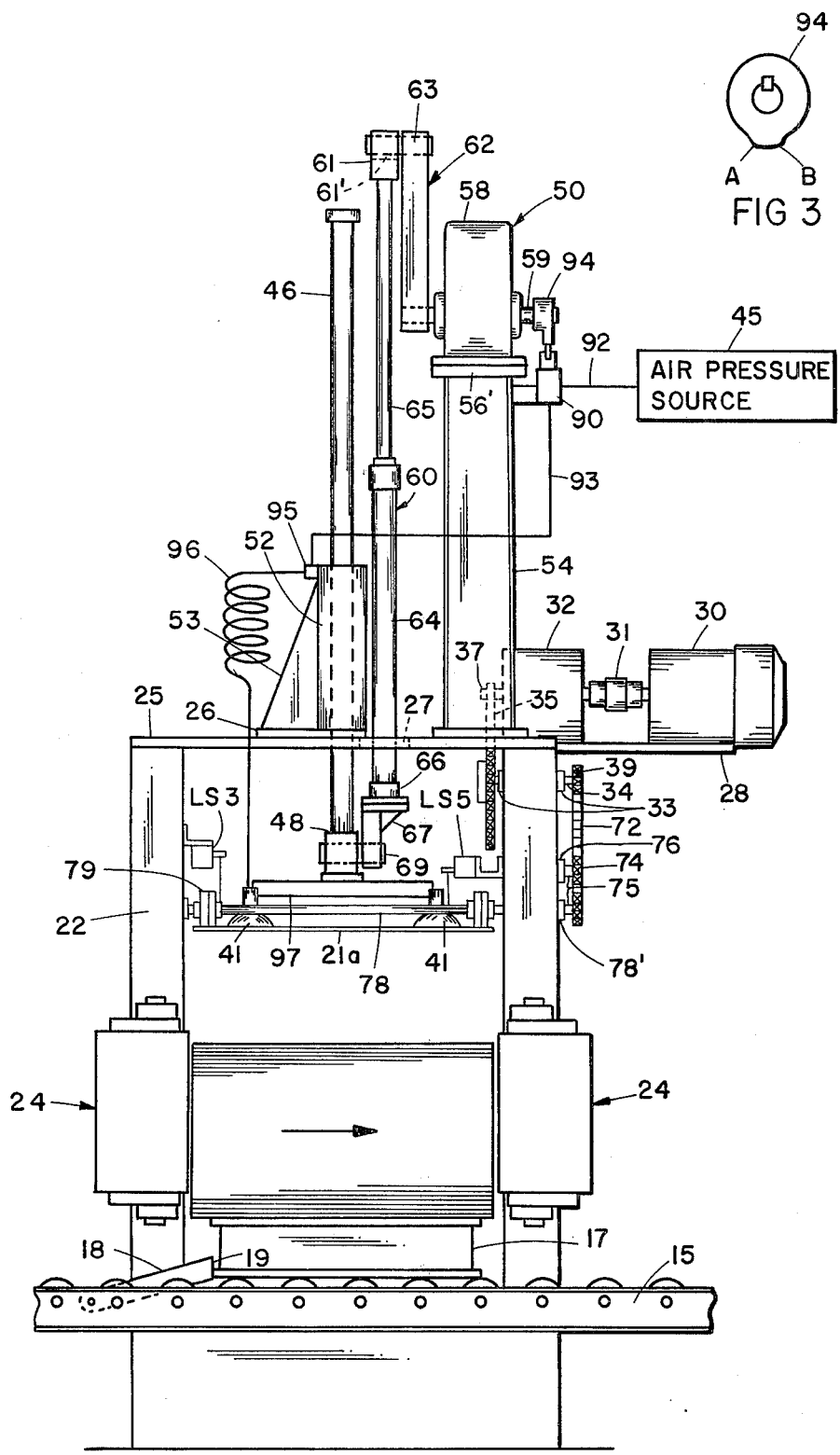

PANEL DESTACKER

BACKGROUND OF THE INVENTION

The present invention relates to a panel destacking apparatus and particularly to novel means for compensating for the thickness of stacks of panels as successive panels are removed therefrom.

In manufacturing operations where it is desired to perform stamping or other manufacturing operations on successive sheets or panels of material, the manufacturing line is supplied with successive sheets by means of a feeder mechanism typically supplied with a stack of panels which must be individually removed and made available to the feeder mechanism.

In conventional panel destacking apparatus, vacuum cups have been positioned on a frame which is reciprocated between fixed limits of travel by means of rigid coupling means to a crank arm or similar drive means to move the head into contact with the stack of panels to remove the uppermost panel from the stack and make it available to suitable feeding means. Since the drive mechanism is rigid making the travel limits fixed, it is necessary to compensate for the varying stack thickness as successive panels are removed or as varying heights of panels are supplied to the destacker. To provide this needed compensation, the support means for the stack of panels has been made adjustable to move the uppermost panel of the stack of panels (when a vertical stack is employed) progressively toward the destacking head as successive panels are removed such that the reciprocating destacking head is effective in removing a panel when moved between its fixed limits of travel. Also, the panel support means have been made adjustable such that when stacks of panels of varying initial heights are supplied to the destacker, the support means can be adjusted to initially fix the uppermost panel in the desired position for removal by the destacking head.

The use of an adjustable support means for the panels, while solving the problem of the diminishing height of the stack of panels when a fixed travel limit for the destacking head is used, represents a relatively costly solution to the problem since the mechanism and control system for moving the stack of panels in the controlled amount required can become relatively complex.

SUMMARY OF THE INVENTION

The destacking apparatus of the present invention, however, provides an improved destacking machine in which the stack of panels is not moved once originally positioned on the machine. Instead, the drive means for a reciprocating panel destacking head is provided with a compressible drive linkage such that the distance of travel of the vacuum head can vary with the stack height such that the head always contacts the stack with the desired pressure necessary for removing the outermost panel without requiring movement of the relatively heavy stack of panels.

It is an object, therefore, of the present invention to provide an improved destacking apparatus in which a reciprocating destacking head moves between limits of travel fixed by the height of the stack of panels.

Another object of the present invention is to provide a destacking apparatus with a destacking head reciprocally movable between support means for one or more sheets of material and means for feeding the material from the destacker whereupon the drive linkage for the picking head is compressible to accommodate stacks of panels of different or varying thicknesses.

Still a further object of the present invention is to provide a compressible linkage between a crank arm drive and a panel picking head in a destacking machine.

Another object of the present invention is to provide an improved panel destacking machine in which support means for a stack of panels is fixed during the destacking operation and the travel limit of the destacking head is controlled by the thickness of the stack of panels.

These and other objects of the present invention will become apparent upon reading the following description thereof together with the accompanying drawings in which:

BRIEF DESCRIPTION OF THE DRAWINGS

FIG. 2 is a right side elevation of the apparatus shown in FIG. 1 partly in schematic form;

FIG. 3 is an enlarged, detailed front view of a cam shown in FIG. 2;

DETAILED DESCRIPTION OF THE PREFERRED EMBODIMENT

Figure 1:
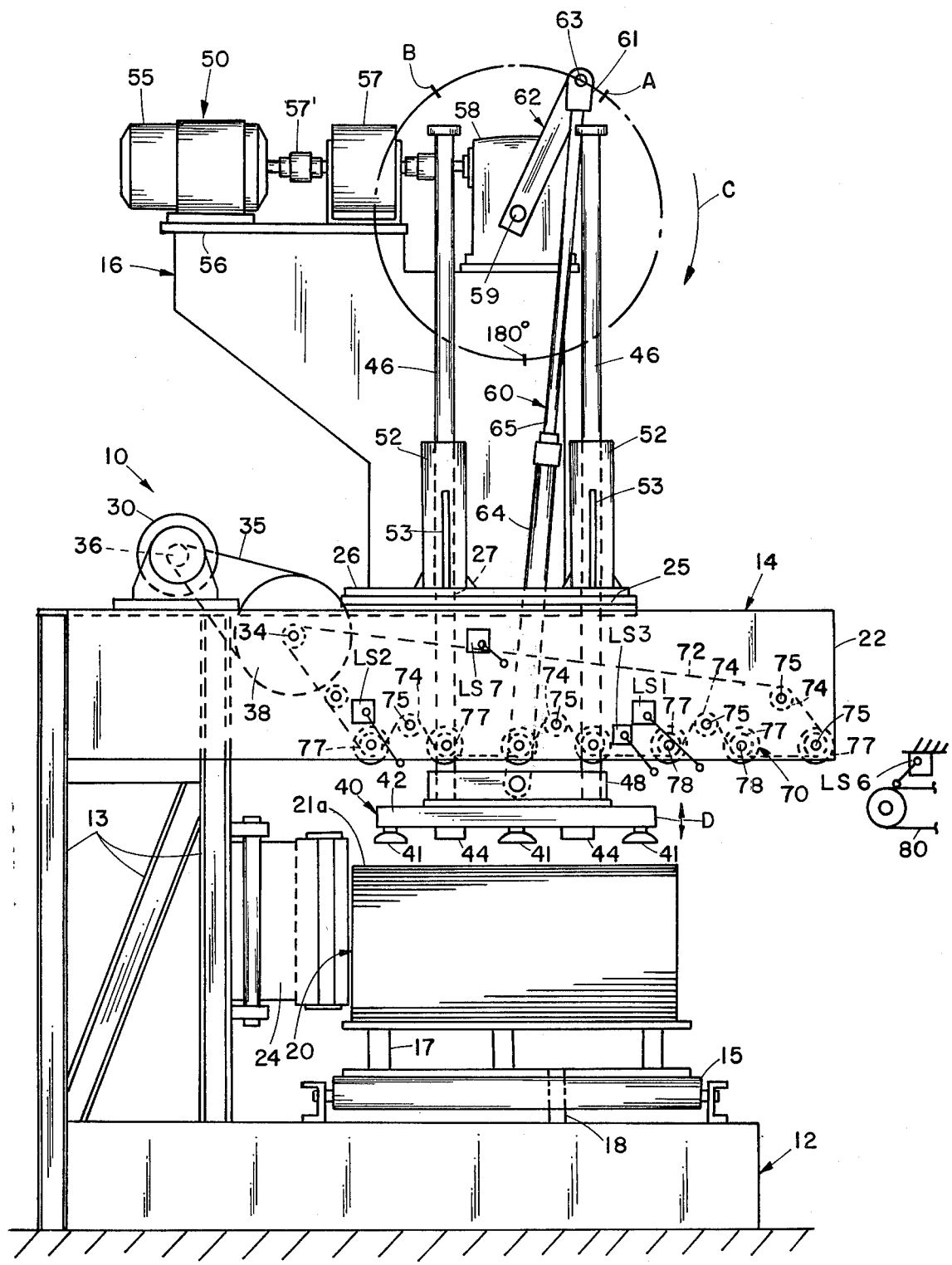
FIG. 1 is a front elevation view of the destacking apparatus of the present invention.

The panel destacking machine 10, shown in FIGS. 1 and 2, generally includes a frame having a base section 12, an intermediate platform 14 coupled to the base by means of suitable struts 13, and an upper frame 16. A stack 20 of sheets or panels 21 is supported on the base in a position such that a reciprocating panel destacking head 40, which is guidably supported by the intermediate platform, is positioned in alignment with the stack. Drive means 50 are positioned on the upper frame and a collapsible or compressible linkage 60 interconnects the destacking head and the drive means such that as the height of the stack diminishes during the operation of the machine, the destacking head travel will automatically adjust to the lowering position of the uppermost panel by compressing a successively lesser amount.

Machine 10 further includes feeding means 70 mounted to platform 14 which strips a sheet held by the destacking head and transports the singulated sheet to output means 80 such as a conveyor for transporting the sheet along a manufacturing line for further processing. Although it is noted that a typical installation will be used for destacking a vertical stack of panels or sheets, the apparatus of the present invention could likewise be used for the singulating or removing of the outermost panel of a horizontally oriented stack of sheets or panels or other non-planar items. The invention thus has application to machines of different scale and orientation than that shown in the preferred embodiment of FIGS. 1–5 now described in detail.

Referring now in detail to FIGS. 1 and 2, it is seen that the base 12 includes a roller conveyor 15 for wheeling a stack of panels positioned on a pallet 17 into position under the destacking head. A retractable stop 18 is provided such that the manually oriented stack can be pulled back against the leading edge 19 of stop 18 to accurately position the stack of panels in alignment under the destacking head.

Coupled to the struts 13 extending upwardly from base 12 is a pair of magnetic sheet fanners 24 which are of conventional design and employed for, in effect, floating the uppermost panels of the sheets of panels when ferromagnetic sheets are employed as is typical with use of the present apparatus. The construction of the magnetic sheet fanners is entirely conventional and these are commercially available. In some installations, they are not required and when non-ferromagnetic panels are used, unnecessary.

Platform 14 extends from the top of struts 13 over the stack of panels and, as best seen in FIG. 2, includes a pair of walls 22 and 23 formed of suitable material such as angle iron covered by sheet metal panels to form a support for plate 25 which supports the upper frame 16 thereon and which includes a central opening 27 permitting the extension of compressible link 60 through plate 25. Positioned between walls 22 and 23 is a second support plate 28 which extends outwardly from the machine, as seen in FIG. 2, and supports thereon a drive motor 30 and clutch brake unit 32 coupled thereto by means of coupling 31 for selectively actuating the feeding means 70. The drive for the feeding means further includes a drive axle 34 extending through wall 23 and rotatably supported thereon by means of bearings 33. A drive chain 35 interconnects a drive sprocket 36 on output shaft 37 of the clutch brake unit 32 and a sprocket 38 mounted to shaft 34.

Coupled to the opposite end of shaft 34 is an additional drive sprocket 39 (FIG. 2) with a drive chain 72 extending thereover and interconnected, as shown diagramatically in FIG. 1, to a plurality of guide sprockets 74 mounted on axles 75 mounted to wall 23 by means of bearings 76 and sprockets 77. The sprocket-axle combinations 74, 75 are positioned intermediate and slightly above a plurality of spaced follower sprockets 77 on axles 78 which extend between walls 22 and 23 and are rotatably supported therebetween by means of bearings 78'.

Positioned at opposite ends of each axle 78 adjacent the interior sides of walls 22 and 23 is a pair of magnetic wheels 79 which are positionable on shaft 78 such that they contact a sheet of material raised into position thereagainst by means of the destacking head 40. As best seen in FIG. 2, the ferro-magnetic sheets are held in position in contact with wheels 79 and, upon the actuation of the clutch brake unit 32, as described below, cause the sheet to move from the destacking machine 10 onto the output means 80. As seen in FIG. 1, means 80 can be a belt conveyor or other suitable conveying means. The magnetic wheels 79 are of conventional design and are commercially available for transporting ferromagnetic panels. When the panels are non-ferromagnetic, different feeding means are employed such as extensible and retractable roller assemblies for transporting a panel from the destacking head 40, once released thereby, onto the output means 80.

Continuing now with the description of the machine 10, it is seen that the upper frame 16 extends upwardly from platform 14 and includes a mounting plate 26 on which there is mounted a pair of spaced sleeves 52 having suitable bushing inserts for slidably receiving and movably supporting therein a pair of vertical guide posts 46 associated with the picking head 40 as described below. Sleeves 52 are fixedly supported on mounting plate 26 by means of reinforcing ribs 53 as seen in FIGS. 1 and 2. Upper frame 16 further includes a superstructure frame 54 comprising angle iron struts and having a mounting platform 56 thereon for receiving a drive motor 55 and clutch and brake unit 57 coupled to the output shaft of the drive motor by means of coupling member 57'. The output shaft of the clutch brake unit 57 is coupled to a gear reduction box 58 supported on a second platform 56' likewise positioned on superstructure 54. The output shaft 59 of gear reduction box 58 extends from opposite sides of the gear reduction box, as best seen in FIG. 2, and includes a crank arm 62 fixedly coupled at one end to shaft 59 and having an opposite end rotatably coupled to end 61 of the collapsible line 60 by means of a suitable bushing 61' and axle 63.

The collapsible link 60 interconnecting arm 62 with head 40 comprises, in the preferred embodiment, a pneumatic cylinder manufactured by the Miller Corporation and having a 19 inch stroke with a cylinder body 64 having a bore of 1½ inches. The cylinder includes an oversized piston rod 65 having a diameter of one inch and is designed for dual action with air inlets at opposite ends of the cylinder body which, in the preferred embodiment, are open to atmospheric pressure. The top end 61 of the cylinder includes a block pivotally coupled to axle 63 of crank arm 62 while the opposite end 66 of cylinder 60 is coupled to a mounting block 67 including a bushing 68, best seen in FIG. 4, to permit the pivotal rotation of block 67 with respect to a fixed shaft 69 force-fitted in fixed relationship in a mounting block 48 associated with and attached to the destacker head 40.

Figure 4:
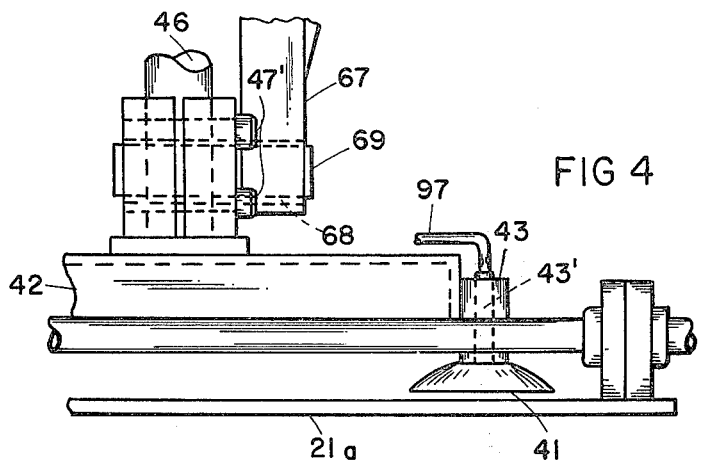
FIG. 4 is an enlarged fragmentary view of a portion of the destacking head shown in FIGS. 1 and 2.

The destacker head 40 comprises a generally rectangular frame 42 manufactured of suitable angle iron or the like with an elongated rectangular mounting block 48 coupled to and extending longitudinally along the central portion of the frame as seen in FIGS. 1, 2 and 4. As seen in FIG. 4, the opposite ends of the mounting block 48 are split to permit the insertion of the guide posts or cylinders 46 which are secured to apertures 47 therein by means of bolts 47'. Guide cylinders 46 are therefore rigidly coupled to the destacker head and extend upwardly through guide sleeves 52 in slidable engagement such that as crank arm 62 is rotated by the rotation of output shaft 59 of the gear reduction box, as indicated by arrow C in FIG. 1, the vacuum head reciprocates in a generally vertical direction, as indicated by arrow D in FIG. 1.

Along the bottom outside edge of frame 42 of the picking head there are positioned six vacuum cups 41, one being positioned in each of the corners of the frame and two intermediate the corners on opposite sides of the frame as seen in FIG. 1. The vacuum cups 41 each include a venturi block 43 having an open channel 43' (FIG. 4) extending into the interior portion of each of the cups 41 to apply a vacuum when the venturi block is actuated by air pressure. Pressure from a source 45 of air pressure, shown in block form in FIG. 2, is supplied to blocks 43 by means of a pneumatic valve 90 coupled to source 45 by means of an air line 92. A cam 94, configurated as shown in FIG. 3, selectively actuates the normally open valve 90 to apply air pressure to an air feed line 93 at the portion of the cycle indicated as A in the diagram of FIG. 1, to apply pressure to a feeder block 95 and thence through a spiral feed line 96 to interconnecting air lines 97 coupled to each of the venturi blocks 43.

Thus, during the portion of rotation of crank arm 62 from point A on the circle shown in FIG. 1 to point B, air pressure is applied to the venturi blocks which in turn provide a reduced pressure to cups 41 such that they will grip and hold a sheet of material. During this interval, the destacker head 40 will be lowered into position in contact with the uppermost sheet 21A of stack 20 and as the crank arm continues through its lowermost position, the destacker head 40 will raise the uppermost sheet from the stack and lift the sheet into contact with rollers 79 or other feeder means whereupon the vacuum or the air pressure is cut off at point B and the destacker head frees the removed sheet and allows its further transportation by the feeder means.

Figure 5:
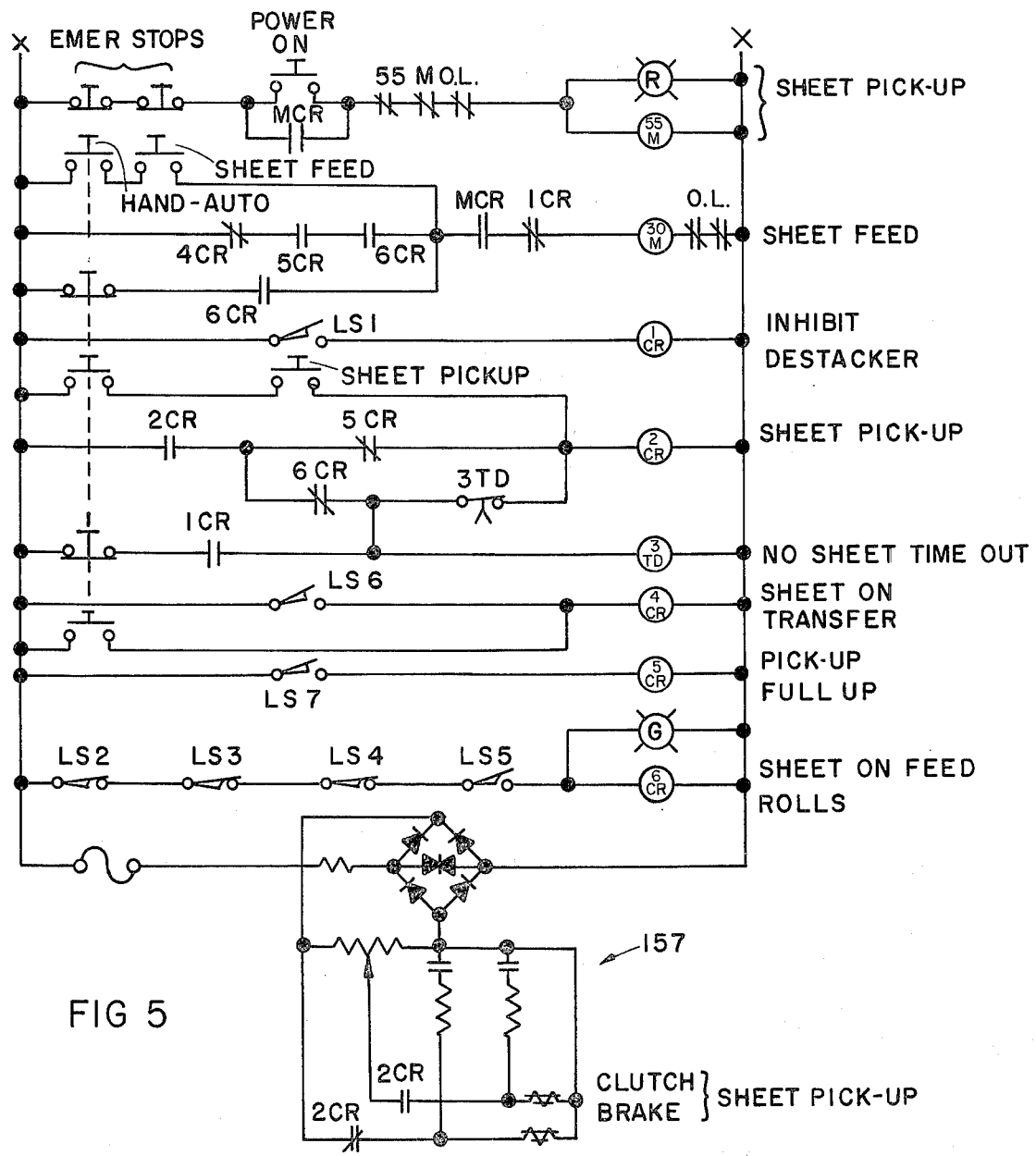
FIG. 5 is an electrical circuit diagram of the control circuit for the apparatus.

A cycle of operation and the control elements coupled to the machine for selectively actuating the clutch and brake units as well as valve 90 to achieve the sequential destacking of the sheets is now presented in conjunction with the FIG. 5 control circuit.

OPERATION

Referring now to FIGS. 2, 3 and 5, the palletized stack of sheets 21 is positioned on base 10 and the magnetic sheet fanners 24 moved into operative position. Initially, it is assumed for the purposes of description that the destacker head is in its fully raised position (closing limit switch LS7) and the feeding and output conveying means are clear of any panels. Operating power is applied to the control circuit via terminals X—X. Actuation of the power switch continuously actuates motor 55 associated with the destacker head which in turn is selectively actuated by the clutch brake unit 57 via control circuit 157 shown at the bottom of FIG. 5. Relay 2CR is actuated by the momentary actuation of the sheet pick up switch initiating the automatic operation of the machine and actuating the clutch brake control unit 157 to begin the rotation of crank arm 62 as shown in FIG. 1.

As the destacker head moves down, valve 90 is actuated by cam 94 (at point A) to apply pressure to the venturi blocks causing a reduced pressure in vacuum cups 41 whereupon the uppermost panel (21a) will be gripped by the destacker head when it contacts the panel. Stops 44 mounted to the underside of frame 42 of the destacker head, as shown in FIG. 1, prevent the panels from damaging the blocks and cups. The reactive force of the palletized stack of panels causes the linkage 60 to compress or collapse as the initially relatively thick stack of panels is contacted by the destacker head. As crank arm 62 swings through the 180° position indicated in FIG. 2, the linkage 60 expands and raises the vacuum head until limit switches LS2-LS5 (which are positioned on platform 14 to engage the destacked panel when the panel is fully seated against the magnetic rollers 78) are actuated to actuate relay 6CR which in turn initiates the actuation of the sheet feed clutch and brake control unit substantially identical to unit 157 and for the sake of simplicity, not shown in the diagram.

At this time, the destacker head continues its upward travel and reaches point B in the cycle whereupon the pressure valve 90 is shut off. Subsequent raising of the head to the fully raised position opens limit switch LS7 to deactuate the destacker brake and clutch unit 57. As the sheet is transported away from the destacker machine by magnetic roller 78, limit switch LS1 (FIGS. 1 and 5) is closed actuating relay 1CR and time delay relay 3TD to inhibit the recycling of the destacker head until the sheet has cleared the destacker mechanism and the head can once again move downwardly to pick up the next successive panel from the stack. Once the sheet has cleared the feeding mechanism and is on the output conveyor 80, LS6 (FIG. 1) is actuated to provide a control signal for the output conveyor and LS1 is reactuated to initiate the next cycle of the lowering and raising of the destacker head 40. In the event the head fails to pick up a panel on the first cycle for one reason or another, or the panel stack has been deleted, the time delay relay 3TD will automatically recycle the destacker head for one, two or more cycles, as desired, to attempt to pick up a panel. In the event the relays 1CR and 2CR are not actuated by the actuation of LS1, after the run-out period of time delay relay 3TD, the machine will automatically shut off.

Thus, it is seen that the machine sequentially removes a panel and raises it into position on the feeder means whereupon the vacuum cups are deactuated, the head raised out of the way and the sheet transported onto the output conveyor. The destacker head then awaits the clearing of the panel from the destacking machine, as indicated by a signal from LS1, until the next destacking cycle is initiated. By virtue of the collapsible link 60, as the stack of panels is deleted by the removal of successive panels, the linkage permits the travel limit to automatically adjust to the changing height of the panel stack. It is noted here that in the preferred embodiment, the cylinder 60 is open to atmospheric pressure such that the weight of the destacker head causes the cylinder to extend to a fully extended position as the crank arm continues rotation past 180°. Once the cylinder reaches its fully extended position, the destacker head lifts the panel to the feeder means. It is seen that the cylinder stroke must be approximately equal to or greater than the maximum panel stack height. Although a 19 inch stroke cylinder was used in the preferred embodiment, cylinders of different strokes are commercially available and can be used as required in a particular installation.

It will become apparent to those skilled in the art that various modifications to the present invention can be made. For example, in place of allowing the cylinder to act as a collapsible linkage or shock absorber between the crank arm and the destacker head, the extension of the cylinder piston rod could be controlled with pressurized fluid as a function of the detected height of the stack of panels. In place of a pneumatic cylinder, hydraulic or spring-operated cylinders likewise could be employed. These and other modifications to the preferred embodiment, however, will fall within the spirit and scope of the present invention as defined by the appended claims.

The embodiments of the invention in which an exclusive property or privilege is claimed are are defined as follows:

1. A panel destacking machine comprising:
   means for supporting a stack of panels;
   a destacker head including means for gripping the outermost panel of said stack of panels;
   means guidably supporting said destacker head for reciprocating movement toward and away from said stack of panels; and drive means for reciprocating said destacker head toward and away from said stack of panels, said drive means including a drive motor, an output drive shaft coupled to said drive motor, a crank arm coupled to said drive shaft to be rotated thereby, and a compressible link rotatably coupled to an end of said crank arm remote from its coupling to said drive shaft, and an opposite end of said linkage is pivotally coupled to said destacker head such that as the thickness of the stack of panels varies, the length of travel of said destacker head varies to compensate for the varying thickness of said stack.

2. The apparatus as defined in claim 1 wherein said compressible link comprises a cylinder with a movable piston rod having a stroke corresponding to the maximum height of the stack of panels employed with said destacking machine.

3. The apparatus as defined in claim 2 wherein said cylinder is a two-way pneumatic cylinder having air ports on opposite ends of the body thereof which are open to atmospheric pressure.

4. The apparatus as defined in claim 1 wherein said destacker head includes at least one guide post extending therefrom and wherein said supporting means includes a sleeve receiving said guide post to permit said destacker head to reciprocate in a controlled path.

5. The machine as defined in claim 4 and further including feed means for receiving a panel from said gripping means and transferring said panel from said machine.

6. The apparatus as defined in claim 5 and further including control means for sequentially actuating said drive means and said feed means to sequentially destack panels from said stack of panels and transfer said panels from said machine.

7. In a machine including a reciprocating element movable toward and away from a work piece and including a frame including means for gripping a work piece, and drive means for providing motive power for said reciprocating element wherein said machine further includes feed means for receiving said work piece from said gripping means and transferring said work piece from said machine, the improvement comprising: a compressible linkage coupling said drive means to said reciprocating element to accommodate different relative positioning of said work piece with respect to said reciprocating element wherein said compressible linkage comprises a cylinder having a body and a piston movable into and out of said body wherein one end of said cylinder is coupled to said drive means and the opposite end of said cylinder is coupled to said frame.

8. The machine as defined in claim 7 wherein said drive means includes a rotatable crank arm pivotally coupled at one end to an end of said cylinder and fixedly coupled at a remote end to a rotating drive shaft whereby the rotating motion of said drive shaft is converted to lineal reciprocal motion of said frame.

9. The machine as defined in claim 7 wherein said frame includes a sleeve and wherein said reciprocating element includes at least one guide post extending through said sleeve to permit said reciprocating element to reciprocate in a controlled path.

* * * * *